(12) United States Patent
Conigliaro et al.

(10) Patent No.: US 12,221,152 B2
(45) Date of Patent: Feb. 11, 2025

(54) MOTOR VEHICLE AND METHOD FOR THE RECONFIGURATION OF THE MOTOR VEHICLE

(71) Applicant: FERRARI S.P.A., Modena (IT)

(72) Inventors: Vito Conigliaro, Modena (IT); Thierry Annequin-Digond, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/591,484

(22) Filed: Feb. 29, 2024

(65) Prior Publication Data
US 2024/0294205 A1   Sep. 5, 2024

(30) Foreign Application Priority Data

Mar. 3, 2023   (IT) .................. 102023000003852

(51) Int. Cl.
| | | |
|---|---|---|
| *B62D 1/184* | (2006.01) | |
| *B60K 26/02* | (2006.01) | |
| *B60T 7/06* | (2006.01) | |
| *B62D 1/181* | (2006.01) | |
| *B62D 5/00* | (2006.01) | |
| *B62D 63/04* | (2006.01) | |

(52) U.S. Cl.
CPC .............. *B62D 1/184* (2013.01); *B60K 26/02* (2013.01); *B60T 7/06* (2013.01); *B62D 1/181* (2013.01); *B62D 5/001* (2013.01); *B62D 63/04* (2013.01)

(58) Field of Classification Search
CPC .......... B62D 1/18; B62D 1/184; B60K 35/53; B60K 2360/685; B60N 2/01
See application file for complete search history.

(56) References Cited

U.S. PATENT DOCUMENTS

| | | | |
|---|---|---|---|
| 5,218,920 A | 6/1993 | Kobayashi | |
| 7,490,694 B1* | 2/2009 | Berg ..................... | B62K 19/46 |
| | | | 180/326 |
| 11,345,388 B2* | 5/2022 | Murayama ............ | B62D 1/181 |
| | (Continued) | | |

FOREIGN PATENT DOCUMENTS

| | | |
|---|---|---|
| CN | 107521548 A | 12/2017 |
| EP | 3712035 A2 | 9/2020 |
| GB | 2598584 A | 3/2022 |

OTHER PUBLICATIONS

Italian Search Report in IT Application No. 202300003852, mailed Sep. 13, 2023, an English Translation attached hereto (9 pages).

*Primary Examiner* — James A English
(74) *Attorney, Agent, or Firm* — Leason Ellis LLP (57) ABSTRACT

A motor vehicle is described, which comprises: a passenger compartment; a pair of wheels; a steering mechanism, which can be operated by a driver and is connected to said wheels through a drive by wire mode; the motor vehicle is selectively available in a first configuration, wherein the passenger compartment defines a first seat for a driver and a second seat for a passenger beside the first seat along a first axis; and a second configuration, wherein the passenger compartment only defines a third seat for the driver; the steering mechanism can be moved along the first axis between a third position taken on when said motor vehicle is in said first configuration and a fourth position taken on when said motor vehicle is in the second configuration; the third and fourth positions are spaced apart from one another along the first axis.

5 Claims, 5 Drawing Sheets

(56) References Cited

U.S. PATENT DOCUMENTS

| | | | |
|---|---|---|---|
| 11,560,112 B2 * | 1/2023 | Ohno | B60R 21/207 |
| 2003/0141736 A1 * | 7/2003 | Chernoff | B60N 2/01 |
| | | | 296/65.01 |
| 2004/0016588 A1 * | 1/2004 | Vitale | B60K 37/00 |
| | | | 180/322 |
| 2005/0283288 A1 * | 12/2005 | Howell | B62D 1/18 |
| | | | 701/41 |
| 2017/0028876 A1 * | 2/2017 | Yamada | B60N 2/0224 |
| 2020/0254906 A1 * | 8/2020 | Luchner | B60N 2/074 |
| 2021/0078625 A1 | 3/2021 | Yamazaki et al. | |
| 2022/0185361 A1 * | 6/2022 | Palm | B60K 26/02 |

* cited by examiner

MOTOR VEHICLE AND METHOD FOR THE RECONFIGURATION OF THE MOTOR VEHICLE

CROSS-REFERENCE TO RELATED APPLICATIONS

This patent application claims priority from Italian patent application no. 102023000003852 filed on Mar. 3, 2023, the entire disclosure of which is incorporated herein by reference.

TECHNICAL FIELD

The present invention relates to a motor vehicle and a method for the reconfiguration of the motor vehicle.

BACKGROUND

As is known, motor vehicles comprise:
a passenger compartment defining a body;
a plurality of wheels;
a steering wheel arranged inside the passenger compartment and operable by a driver to steer the front wheels and therefore allow the vehicle to travel a curved trajectory; and
a set of pedals comprising at least one accelerator pedal and one brake pedal which can be operated by the driver to increase the driving torque or to exert a braking torque, respectively, on the wheels in order to control the speed of the motor vehicle.

Passenger compartments of motor vehicles normally intended for road use have the so-called 'two-seater' configuration.

In this 'two-seater' configuration, the passenger compartment comprises a pair of front seats intended to be occupied by a driver and a passenger, respectively, and arranged side-by-side along a transversal direction of the motor vehicle orthogonal to a longitudinal direction defining a normal driving direction of the motor vehicle.

The steering wheel and set of pedals are located in front of the driver's seat and substantially at a front left or right corner of the motor vehicle.

With particular reference to sports cars, passenger compartments are known to have the so-called 'single-seater' configuration.

In this 'single-seater' configuration, the passenger compartment comprises a single front seat positioned centrally in front of the steering wheel and the set of pedals.

There is a need in the field for motor vehicles which allow easy and convenient reconfiguration between the above-mentioned 'single-seater' and 'two-seater' configurations. EP-A-3712035 discloses a steering assembly for a motor vehicle, in which a steering wheel can be moved to multiple positions for manual operation, in both manufacturing and use contexts.

SUMMARY

The object of the present invention is to provide a motor vehicle which allows the above-mentioned need to be met.

Said object is achieved by the present invention, insofar as it relates to a motor vehicle as defined in the appended claims and described herein.

The present invention also relates to a method for the reconfiguration of the motor vehicle as described herein.

BRIEF DESCRIPTION OF THE DRAWINGS

In order to better understand the present invention, a non-limiting preferred embodiment thereof will now be described by way of example with reference to the accompanying drawings, in which.

DESCRIPTION OF EMBODIMENTS

Figure 1:
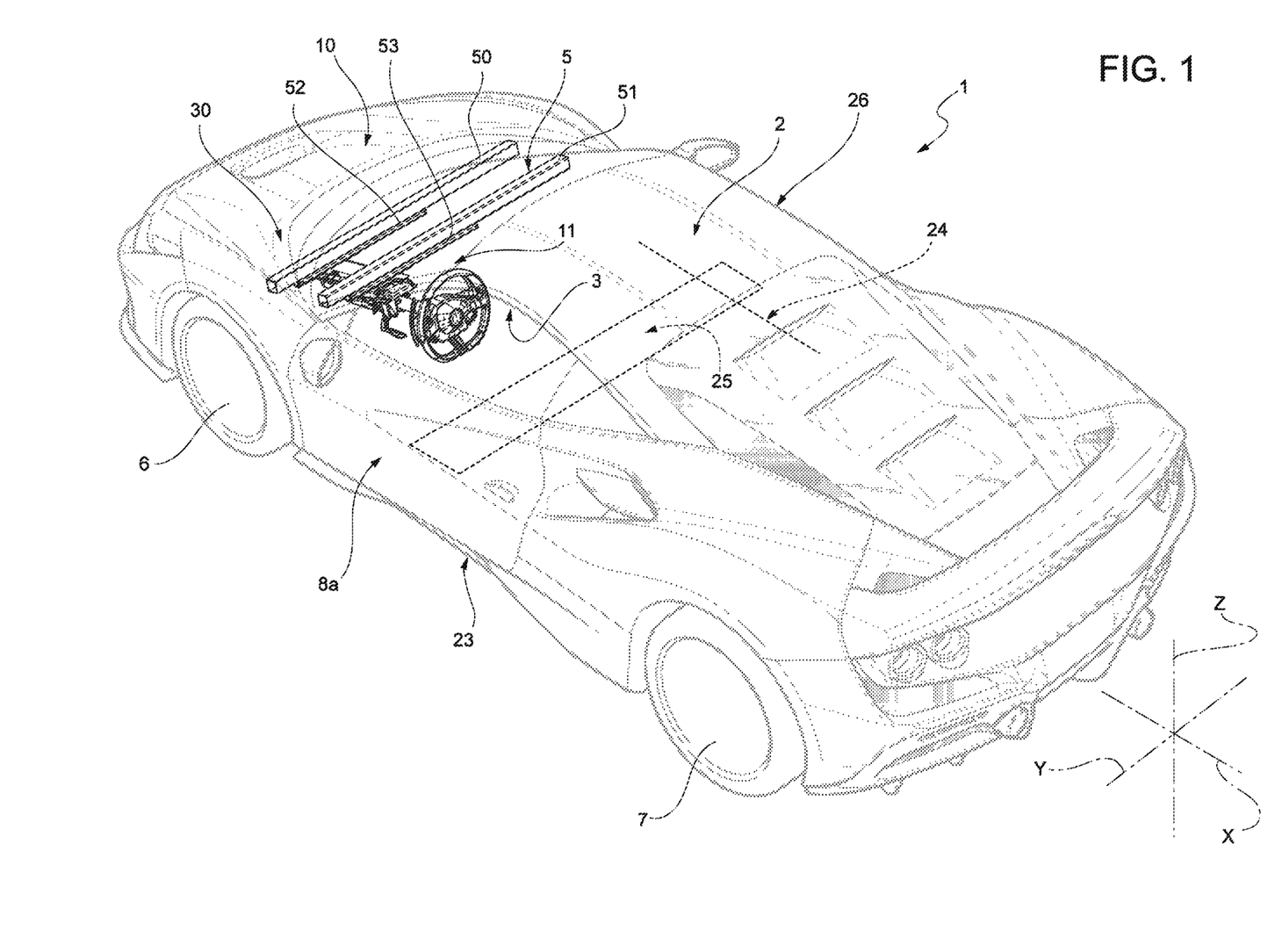
FIG. 1 is a perspective view of a motor vehicle made according to the teachings of the present invention, with parts removed for clarity.

With reference to FIG. 1, the numeral 1 indicates a motor vehicle comprising a body 2 defining a passenger compartment 3.

It should be specified that, below in this description, expressions such as "above", "below", "in front of", "behind" and the like are used with reference to the normal driving direction of the motor vehicle 1.

The motor vehicle 1 further comprises (FIG. 5):
one pair of front wheels 6 and one pair of rear wheels 7;
an engine 9 of a known type, not shown in detail and operatively connected to the wheels 6 and/or 7 to exert a driving torque on the wheels 6 and/or 7;
a gearbox 20 interposed between the engine 9 and the wheels 6 and/or 7, which can be operated to vary the transmission ratio between an output member of the engine 9 and the wheels 6, 7; and
a braking system 21 which can be operated to exert a braking torque on the wheels 6, 7.

The motor vehicle 1 further comprises (FIG. 1):
a windscreen 5 delimiting the passenger compartment 3 at the front;
a backrest (not shown) delimiting the passenger compartment 3 at the rear;
a roof 26 delimiting the passenger compartment 3 at the top; and
a pair of doors 8a hinged to the body 2 and movable between a closed position, wherein they delimit the passenger compartment 3 at the sides and prevent entry into/exit from the passenger compartment 3, and an open position, wherein they allow entry into/exit from the passenger compartment 3.

It is also possible to define:
a longitudinal axis X integral with the motor vehicle 1, arranged, in use, horizontal and parallel to a normal driving direction of the motor vehicle 1;
a transversal axis Y integral with the motor vehicle 1, arranged, in use, horizontal and orthogonal to the axis X; and
an axis Z integral with the motor vehicle 1, arranged, in use, vertical and orthogonal to the axes X, Y.

The body 2 also comprises a pair of longitudinal, end door sills 23, 24, opposite each other. The door sills 23, 24 delimit the passenger compartment 3 and are adjacent to respective doors 8a when the doors 8a are in their closed positions.

In addition, the motor vehicle 1 comprises control members 10 which can be operated by the driver to set a forward trajectory of the motor vehicle 1 at a desired speed.

As is well known, the control members 10 comprise:

a steering mechanism 11 arranged inside the passenger compartment 3 and operable by the driver; and a set of pedals 12 (only schematically shown in FIG. 5) also arranged inside the passenger compartment 3 and operable by the driver.

Figure 5:
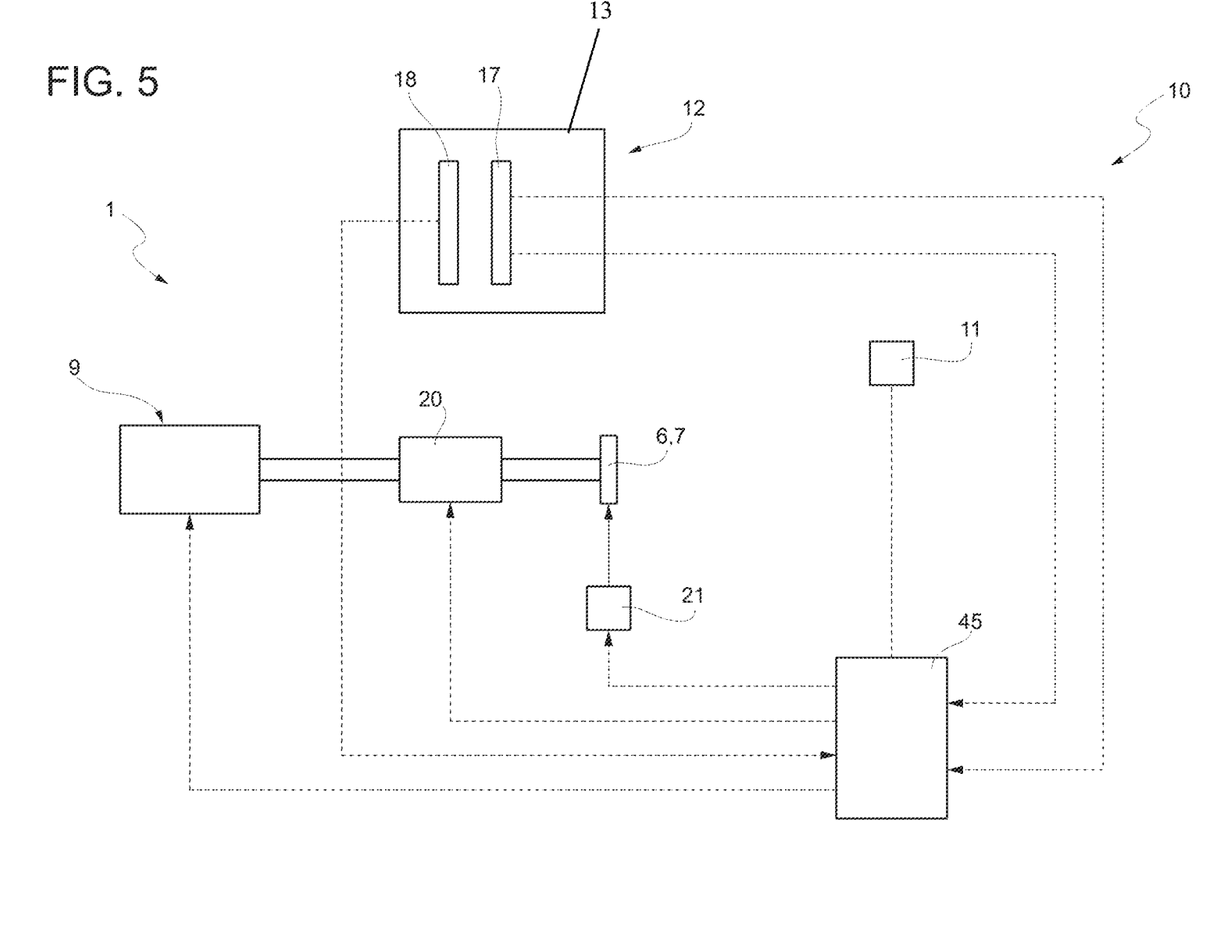
FIG. 5 is a functional diagram of some components of the motor vehicle shown in FIGS. 1 to 4.

The set of pedals 12 comprises, in a nutshell and in a manner not described in detail as it is not necessary for the purpose of the present invention and only schematically illustrated in FIG. 5:

an accelerator pedal 17 protruding outwards from the base 13 and operable from a released position to a full stroke position in order to adjust the value of the driving torque generated by the engine 9; and a brake pedal 18 also protruding from the base 13 and operable to exert an adjustable braking torque value generated by the braking system 21 on the wheels 6 and/or 7.

If the engine 9 is an electric engine, the gearbox 20 and the clutch pedal are not present.

If the gearbox 20 is semi-automatic or automatic, the clutch pedal is not present.

The control members 10 are connected to the engine and wheels 6 and/or 7 through a drive-by-wire mode, thus producing a technology known in the industry as 'drive by wire'.

The term 'drive by wire' in the present description is intended to mean that the steering mechanism 11 has no physical or mechanical connection to the wheels 6, 7.

Similarly, the accelerator pedal 17 has no physical or mechanical connection to the engine 9, and the brake pedal 17 has no mechanical connection to the braking system 21.

The passenger compartment 3 further comprises a front location 25 which defines a driver's seat.

The location 25 is only schematically shown in FIG. 1.

The passenger compartment 3 of the motor vehicle 1 is selectively movable, in a manner not described in detail because it is not necessary for the understanding of the present invention, between:

a 'two-seater' configuration, in which the location 25 defines a first seat for a driver and a second seat for a passenger arranged side-by-side along the axis Y; and a 'single-seater' configuration, in which the location 25 defines a single third seat for the driver.

In the 'two-seater' configuration, the first seat is beside the door sill 23, and the second seat is beside the door sill 24.

In addition, the first seat faces the steering mechanism 11 and the set of pedals 12 to allow the driver to operate the steering mechanism 11 and the set of pedals 12.

In the 'single-seater' configuration, the third seat is arranged in a central position between the door sills 23, 24 and faces the steering mechanism 11 and the set of pedals 12.

Figure 2:
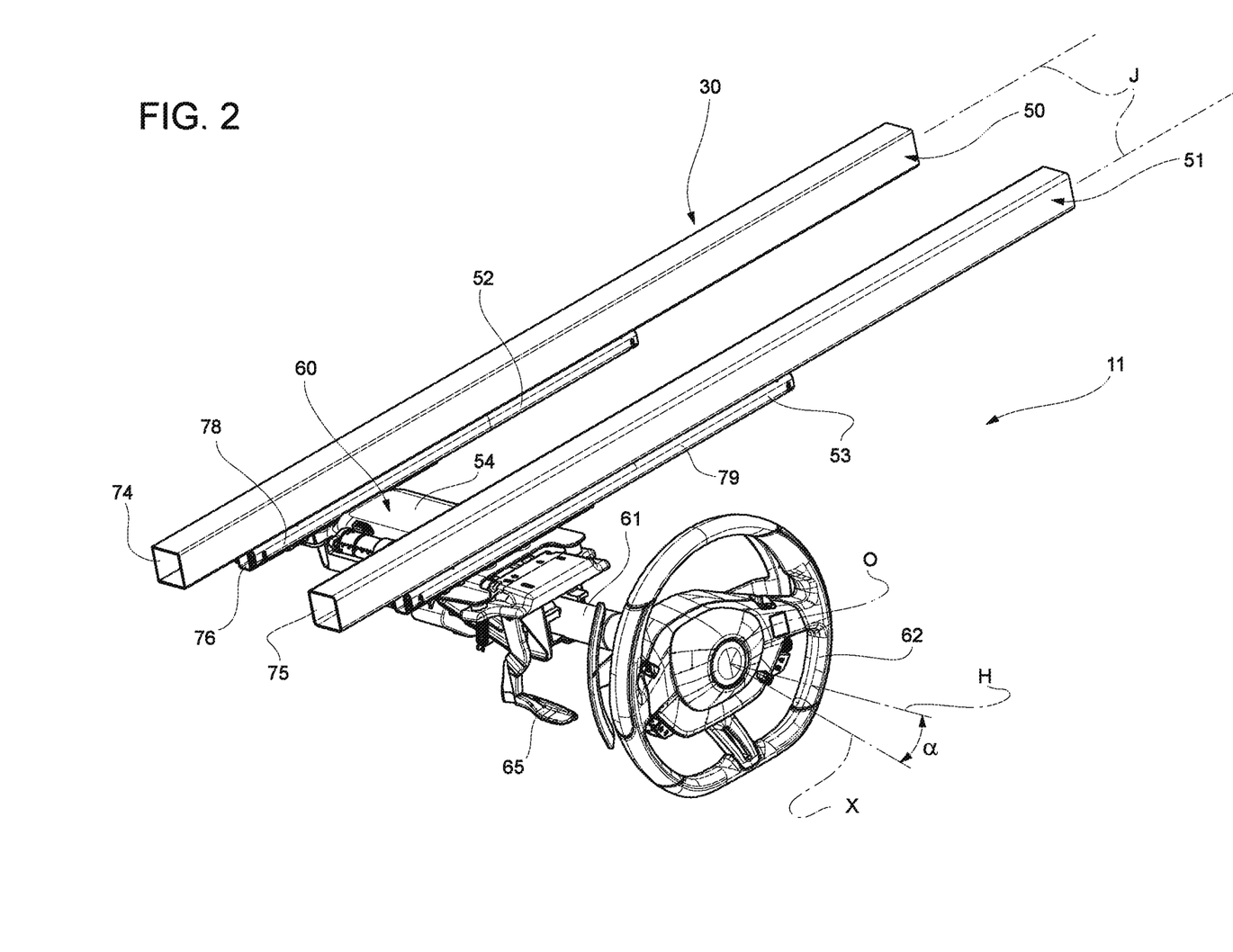
FIGS. 2 and 3 are perspective views of a steering mechanism of the motor vehicle shown in FIG. 1 in a first and in a second operating position, respectively.
Figure 3:
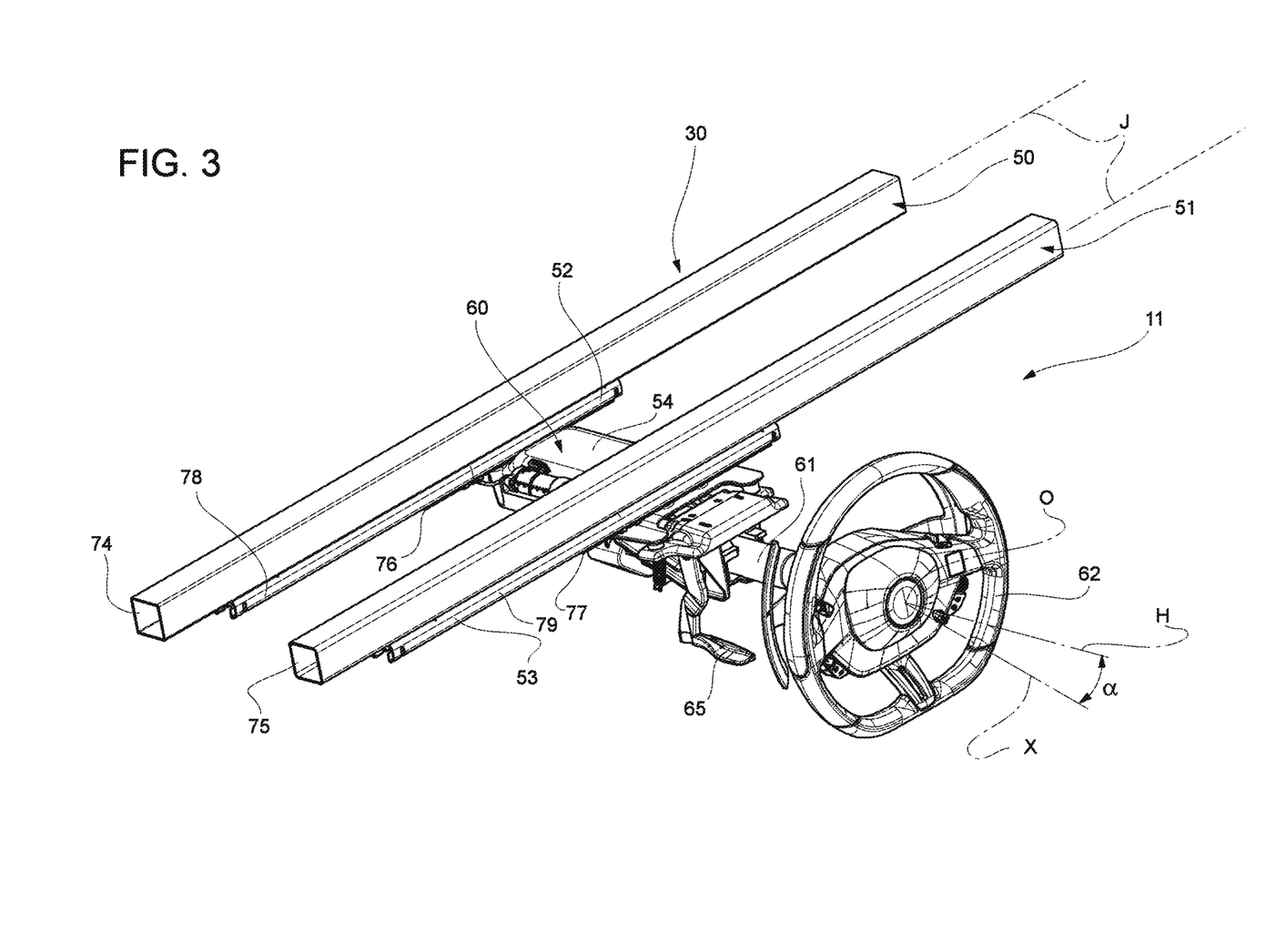
Figure 4:
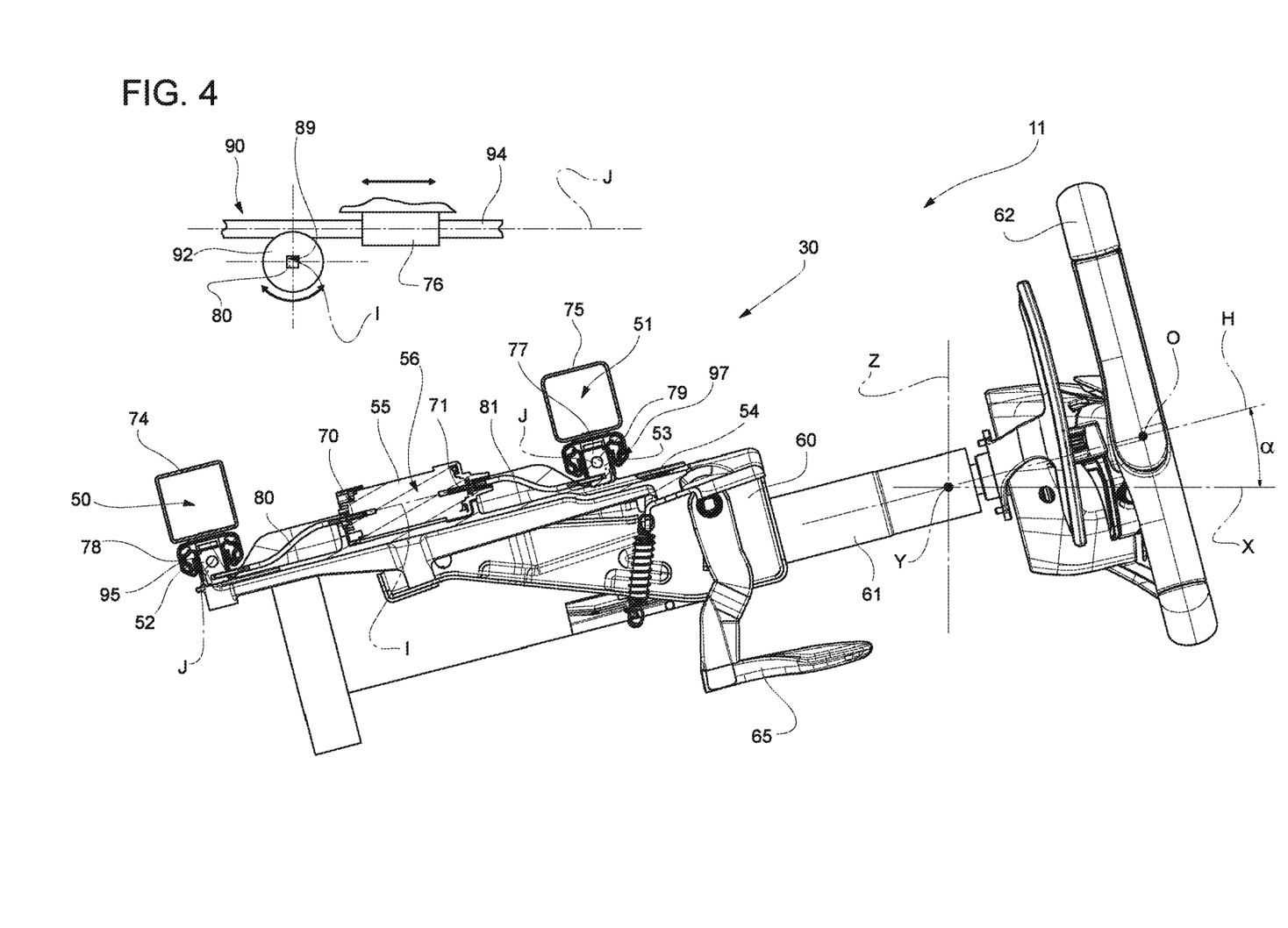
FIG. 4 is a side view of the steering mechanism shown in FIGS. 2 and 3.

The steering mechanism 11, in turn, comprises (FIGS. 2 to 4):

a support body 60 fixed to the body 2;

a steering shaft 61 mounted so that it can rotate around an axis H within the support body 60; and a steering wheel 62 which can be gripped by the driver to rotate the steering shaft 61 around the axis H by an angle associated with a desired steering angle of the wheels 6, 7.

The motor vehicle 1 also comprises a control unit 45 (FIG. 5) programmed to receive, as input, the operations requested from the steering mechanism 11 and set of pedals 12 and to generate, as output, appropriate control signals for the engine 9, gearbox 20, braking system 21 and wheels 6, 7.

In particular, the control unit 45 is programmed to control the rotation of the wheels 6, 7 by an angle associated with the angle of rotation of the steering wheel 62 around the axis H and in the same direction of rotation.

In the case illustrated herein, the axis H is inclined with respect to the horizontal plane defined by the axes X, Y by an angle $\alpha$ (FIG. 4).

The steering mechanism 11 also comprises a lever 65 that can be selectively moved between:

a locking position, in which it fixedly constrains the steering shaft 61 to the support body 60; and an adjustment position, in which it allows the steering shaft 61 to slide relative to the support body 60 along the axis H and the consequent adjustment of the position of the steering wheel 62 relative to the body 2 along the axis H, and the rotation of a centre O of the steering wheel 62 along an arc of a circle lying in the plane defined by the axes X, Z and the consequent adjustment of the angle $\alpha$ defined between the axes X, H.

Advantageously, the steering mechanism 11 can be moved along the axis Y to allow the motor vehicle 1 to be moved between the first and the second configuration.

In this way, the steering mechanism 11 can be moved parallel to the axis Y between:

a first position (FIG. 2) taken on when the passenger compartment 3 is in the first configuration and the steering wheel 62 faces the first seat defined by the location 25; and a second position (FIG. 3) taken on when the passenger compartment 3 is in the second configuration and the steering wheel 62 faces the third seat defined by the location 25.

The steering mechanism 11 is adjacent to the door sill 23 when it is arranged in the first position (FIG. 2). In this first position, a first distance between the steering wheel 62 and the door sill 23 is smaller than a second distance between the steering wheel 62 and the door sill 24. Said first and second distances are measured along the axis Y.

A left-hand driving mode of the motor vehicle 1 is thus achieved.

In greater detail, the steering wheel 62 is in a central position between the door sills 23, 24, when the steering mechanism 12 is in the second position (FIG. 3). In this second position, the steering wheel 62 is equally spaced apart from the door sills 23, 24 along the axis Y.

With reference to FIGS. 2 to 4, the body 2 also comprises a pair of cross members 50, 51 elongated along respective axes J parallel to the axis Y and spaced apart along the axis X.

The cross member 50 is arranged in front of the cross member 51.

The cross members 50, 51 extend over the full width of the motor vehicle 1 along the axis Y and comprise:

respective first ends adjacent to the door sill 23 of the body 2; and respective second ends adjacent to the door sill 24 of the body 2.

The cross members 50, 51, in turn, comprise:

respective box-shaped support bodies 74, 75 fixed to the body 2; and respective hollow elements 78, 79 fixed to corresponding support bodies 74, 75 and defining corresponding seats 95, 97 open parallel to the axis Y and slidably engaged parallel to the axis Y by respective slides 52, 53.

In addition, the passenger compartment 3 comprises a connection assembly 30 (FIGS. 2 to 4) interposed between the steering mechanism 1 and the body 2 and designed to enable the translation of the steering mechanism 12 parallel to the axis Y between the first and the second position.

The connection assembly 30, in turn, comprises:
- a pair of guides 52, 53 elongated along respective axes J and spaced apart along the axis X, and arranged within respective box-shaped bodies 74, 75 defined by respective cross members 50, 51;
- a pair of slides 76, 77 elongated along respective axes J and spaced apart along the axis X, and slidable on respective guides 52, 53 along said respective axes J; and
- an electric motor 55 operatively connected to the slides 76, 77 via a transmission assembly 56 and operable to convert the rotation of a pair of output shafts 70, 71 of the electric motor 55 around a common axis I into the sliding of the slides 76, 77 on the relevant guides 52, 53 parallel to the axis Y and the consequent movement of the steering mechanism 11 between the first and the second position.

The slide 76, in particular, is arranged in front of the slide 77.

The guides 52, 53 and the slides 76, 77 are arranged at a top face 54 of the support body 60.

The guides 52, 53 and the related slides 76, 77 are also arranged below the corresponding cross members 50, 51.

In particular, the guides 52, 53 are arranged within respective seats 95, 97 of corresponding cross members 50, 51.

The guides 52, 53 and the respective seats 95, 97 extend substantially to a width equal to half the width of the cross members 50, 51 and of the motor vehicle 1 along the axis Y, and comprise:
- respective first ends adjacent to the door sill 23 of the body 2; and
- respective second ends equally spaced apart between the door sills 23, 24 parallel to the axis Y.

The axis I is parallel to the axis H.

With reference to FIG. 4, the transmission assembly 56, in turn, comprises:
- a pair of flexible shafts 80, 81 angularly integral with respective output shafts 70, 71 of the electric motor 55 around the axis I;
- a pair of connection elements 90, each functionally interposed between a flexible shaft 80, 81 and a respective slide 76, 77, and each configured to convert the rotation in a first (second) direction of the respective flexible shaft 80 into the translation in a first (second) direction of the respective slide 76, 77 along the respective axis J parallel to the axis Y.

Each connection element 90 comprises, in particular (FIG. 4):
- a related helical gear wheel 92, keyed to the respective flexible shaft 80, 81, so that it can rotate integrally with its flexible shaft 80, 81 around the axis I, and defining a respective seat 89 engaged by the flexible shaft 80, 81; and
- a related rack 94 carried by the respective slide 76, 77, elongated along the respective axis J and meshing with the respective gear wheel 92 in a radially external position with respect to the related seat 89.

The motor vehicle 1 further comprises a system for moving the set of pedals 12 parallel to the axis Y, which is not described in detail as it is not part of the present invention.

In a nutshell, the above-mentioned movement system is operable to cause the movement of the set of pedals 12 parallel to the axis Y between:
- a third position taken on when the passenger compartment 3 is in the first configuration and the steering mechanism 11 is in the first position and faces the first seat defined by the location 25; and
- a fourth position taken on when the passenger compartment 3 is in the second configuration and the steering mechanism 11 is in the second position and faces the third seat defined by the location 25.

The set of pedals 12 is adjacent to the door sill 23 when it is in the third position.

The set of pedals 12 is in a central position between the door sills 23, 24 when it is in the fourth position.

The operation of the motor vehicle 1 is described starting from a condition in which the passenger compartment 3 is in the 'two-seater' configuration.

The operation of the motor vehicle 1 is also described starting from a condition in which the lever 65 is in the locking position.

In this 'two-seater' configuration, the location 25 defines the first seat for the driver and the second seat for a passenger arranged side-by-side parallel to the axis Y.

More precisely, the first seat is beside the door sill 23, and the second seat is beside the door sill 24 parallel to the axis Y.

As shown in FIGS. 1 and 2, the steering mechanism 11 and the set of pedals 12 (not shown in the aforementioned FIGS. 1 and 2) are also arranged in the first and the third position, respectively, in which they face the first seat defined by the location 25 along the axis X.

In addition, the first seat faces the steering mechanism 11 and the set of pedals 12 along the axis X to allow the driver to operate the steering mechanism 11 and the set of pedals 12 and thus control the forward trajectory and the speed of the motor vehicle 1.

If it is desired to reconfigure the motor vehicle 1 so as to arrange the passenger compartment 3 into the 'single-seater' configuration, it is sufficient to operate the electric motor 55 in a first direction via a dedicated control and under certain operating conditions of the motor vehicle 1.

The operation of the electric motor 55 in the first direction causes the output shafts 70, 71 and the respective flexible shafts 80, 81 to rotate in the same first direction around the axis I.

These rotations of the flexible shafts 80, 81 cause, through the respective connection elements 90, the translation of the slides 76, 77 along the respective axes J and, therefore, of the steering mechanism 11 in the first direction along the axis Y in relation to the body 2.

More specifically, the rotations of the flexible shafts 80, 81 around the axis I result in the rotation of the respective gear wheels 92 around the axis I, and the translation of the respective racks 94 and slides 76, 77 parallel to the respective axes J.

Since the transmission of motion between the gear wheels 92 and the respective racks 94 is irreversible, the slides 76, 77 remain in the desired position in the event of a stop or failure of the electric motor 55.

As a result, the steering mechanism 11 reaches the second position shown in FIG. 3 in which it faces the third seat defined by the driving position.

More precisely, the steering mechanism 11 is in a central position between the door sills 23, 24 when it is in the second position.

The system for moving the steering mechanism 11 is operated to cause the movement of the set of pedals 12 parallel to the axis Y until it reaches the fourth position.

The set of pedals 12 is in a central position between the door sills 23, 24 and faces the third position defined by the location 25 when it is in the fourth position.

The location 25 is reconfigured so as to only define the third seat for the driver, which is not necessary for the understanding of the present invention.

The single third seat is arranged in a central position between the door sills 23, 24 and faces the steering mechanism 11 and the set of pedals 12.

At this point, the passenger compartment 3 has taken on the 'single-seater' configuration.

The passenger compartment 3 is repositioned from the 'single-seater' configuration to the 'two-seater' configuration by simply operating the electric motor 55 in a second direction opposite the first direction, so as to return the steering mechanism 11 to the first position.

Subsequently or simultaneously, the set of pedals 12 is arranged into the third position and the location 25 is reconfigured to define the first seat for the driver and the second seat.

Both when the passenger compartment 3 is in the 'two-seater' configuration and when the passenger compartment 3 is in the 'single-seater' configuration, the position of the steering wheel 62 in relation to the body 2 along the axis H and the value of the angle α can be adjusted simply by moving the lever 65 into the unlocking position and moving the steering shaft 61 and steering wheel 62 in relation to the support body 60 and then arranging the lever 65 into the locking position once the above adjustment is complete.

The advantages enabled by the present invention will be apparent from an examination thereof.

In greater detail, the steering mechanism 11 can be moved along the axis Y between the first and the second position, so that the passenger compartment 3 can be moved between the 'two-seater' configuration and the 'single-seater' configuration.

In fact, the steering wheel 62 in the first position of the steering mechanism 11 faces, along the axis X, the first seat for the driver defined by the location 25 adjacent to the door sill 23.

Similarly, the steering wheel 62 in the second position of the steering mechanism 11 faces, along the axis X, the single third seat for the driver defined by the location 25 in a central position between the door sills 23, 24 along the axis Y.

The electric motor 55 and the transmission assembly 56 formed by the flexible shafts 80, 81 and the respective connection elements 90 ensure a fast and precise movement of the steering mechanism 11 between the above-mentioned first and second positions.

The connection elements 90 irreversibly transmit the motion from the electric motor 55 to the respective slides 76, 77 due to the presence of the coupling between respective gear wheels 92 and the corresponding racks 94.

This ensures that the slides 76, 77 remain in the desired position in the event of a stop or failure of the electric motor 55.

The fact that the slides 76, 77 are fixed to the support body 60 of the steering mechanism 12 allows the position of the steering wheel 62 along the axis H and the angle α to be adjusted by simply operating the lever 65 both when the motor vehicle 1 is in the 'single-seater' configuration and when the motor vehicle 1 is in the 'two-seater' configuration.

Lastly, it is clear that modifications and variations may be made to the motor vehicle 1 and the reconfiguration method according to the present invention, without however departing from the scope of protection defined by the claims.

In particular, in the 'two-seater' configuration, the first seat could be positioned facing the door sill 24 and the second seat could be positioned facing the door sill 24, thus achieving a right-hand driving mode of the motor vehicle 1.

The invention claimed is:

1. A motor vehicle comprising:
   a body;
   a passenger compartment;
   at least one pair of wheels;
   a steering mechanism, which can be operated by a driver in order to adjust a steering angle of at least two of said wheels;
   said steering mechanism being connected to said wheels through a drive by wire mode;
   a first guide fixed to said body;
   a first slide fixed to said steering mechanism and coupled to said first guide so as to slide parallel to said first axis;
   a second guide fixed to said body in a position spaced apart from said first guide along a second axis, which is orthogonal to said first axis and parallel to a normal longitudinal driving direction of said motor vehicle;
   a second slide fixed to said steering mechanism in a position spaced apart from said first slide along said second axis; and
   a motor member fixed to said body and capable of being selectively operated in order to cause the translation of said first slide on said first guide parallel to said first axis;
   said motor vehicle being selectively available in:
      a first configuration, wherein said passenger compartment defines a first seat for a driver facing said steering mechanism and a second seat for a passenger beside said first seat along a first axis; and
      a second configuration, wherein said passenger compartment only defines a third seat for said driver;
   said first seat being arranged in a first position and said second seat being arranged in a second position in said first configuration, and said third seat being arranged, in said second configuration, in a third position spaced apart from said first position along said first axis;
   wherein said steering mechanism can be moved along said first axis between a fourth position taken on when said motor vehicle is in said first configuration and a fifth position taken on when said motor vehicle is in said second configuration; said third and fourth positions being spaced apart from one another along said first axis;
   said motor member being operatively connected to said first and second slides in order to cause the translation of said first and second slides relative to said respective first and second guides parallel to said first axis;
   a transmission assembly interposed between said motor member and said first and second slides;
   said transmission assembly being configured to irreversibly transmit, in use, a motion from said motor member to said first and second slides;
wherein said transmission assembly comprises, in turn:
   a first flexible shaft operated by said motor and operatively connected to said first slide;
   a second flexible shaft operated by said motor and operatively connected to said second slide;
   a first connection element interposed between said first flexible shaft and said first slide and configured to convert the rotation of said first flexible shaft in a first direction into the translation of said first slide along said first axis in a second direction; and a second connection element interposed between said second flexible shaft and said second slide and configured to convert the rotation of said second flexible shaft in said first direction into the translation of said first slide parallel to said first axis in said second direction.

2. The motor vehicle according to claim 1, further comprising:

a set of pedals comprising, in turn, a first accelerator pedal and a second brake pedal;

an engine; and a braking system;

said first accelerator pedal being capable of being operated by said driver in order to adjust the torque delivered by said engine and being operatively connected to said wheels through the drive by wire mode;

said second brake pedal being capable of being operated by said driver in order to exert a braking torque upon at least one of said wheels and being operatively connected to said wheels through the drive by wire mode;

said set of pedals being capable of moving along said first axis between:

a sixth position taken on when said motor vehicle is, in use, in said first configuration; and a seventh position taken on when said motor vehicle is, in use, in said second configuration;

said sixth and seventh positions being spaced apart from one another along said first axis;

said set of pedals being movable between said sixth and seventh positions independently of the movement, in use, of said steering mechanisms between said first and second positions.

3. The motor vehicle according to claim 1, wherein said motor member is an electric motor member.

4. The motor vehicle according to claim 1, wherein said body comprises a first door sill and a second door sill extending along said second axis;

said first door sill and said second door sill being spaced apart from one another along said first axis;

said steering mechanism being arranged, in said first position, adjacent to said first door sill and at a first distance from said first door sill which is smaller than a second distance from said second door sill, when said motor vehicle is in said first configuration; said first and second distances being measured along said first axis;

said steering mechanism being arranged, in said second position, in a position equally spaced apart from said first and second door sills along said first axis, when said motor vehicle is in said second configuration.

5. The motor vehicle according to claim 1, wherein said steering mechanism comprises:

a steering wheel, which can be operated by a driver;

a support body designed to support said steering wheel and fixed to said first slide; and a steering shaft fixed to said steering wheel and mounted in a telescopic manner inside said support body along a third axis, which is orthogonal to said first axis;

the position of said steering shaft relative to said support body along said third axis and/or an angle defined between said third axis and said second axis being adjustable.

* * * * *